July 7, 1964 W. A. YONKERS 3,140,430
STANDARD MAGNET STRUCTURE WITH PREDETERMINED AIR-GAP
Filed July 15, 1960 2 Sheets-Sheet 1
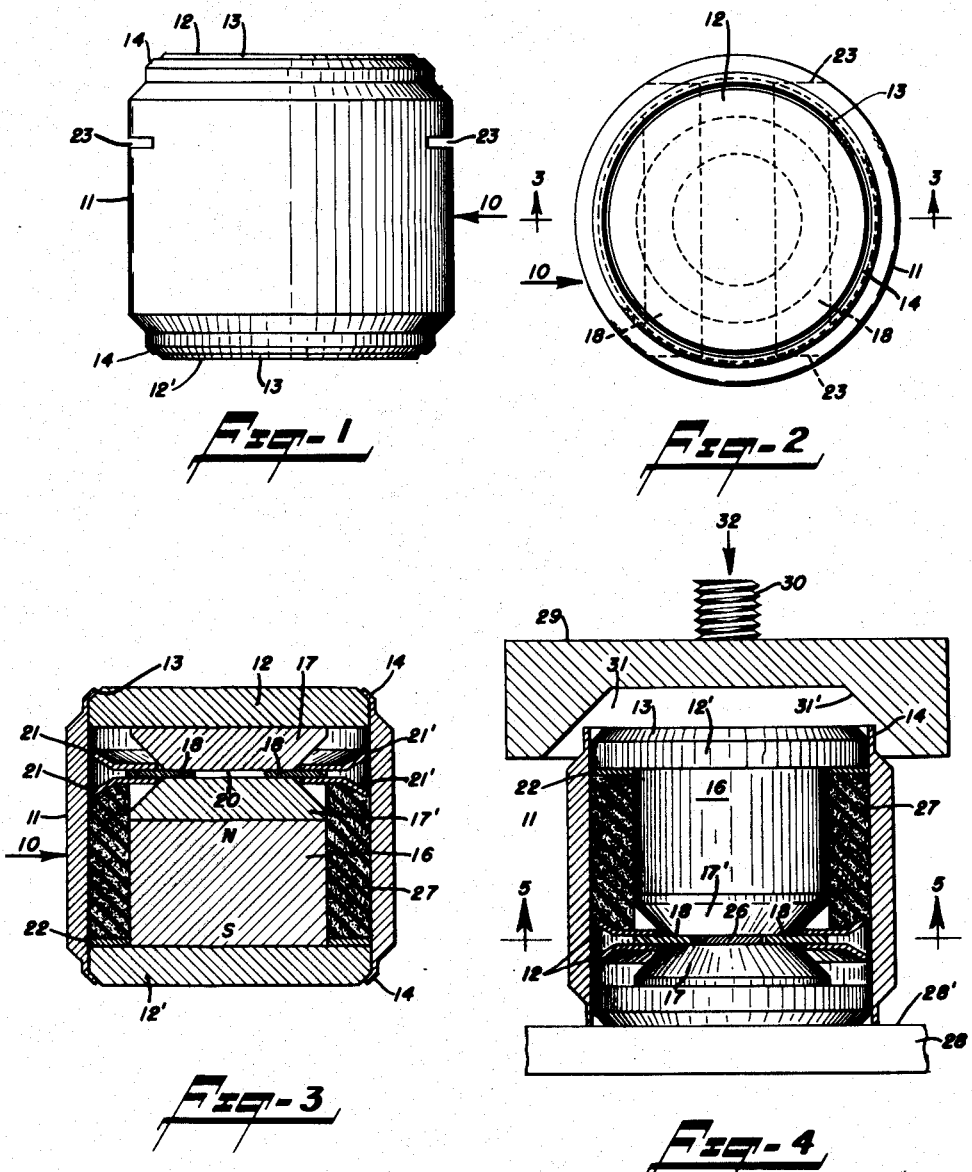
WILLIAM A. YONKERS
INVENTOR.

July 7, 1964 W. A. YONKERS 3,140,430
STANDARD MAGNET STRUCTURE WITH PREDETERMINED AIR-GAP
Filed July 15, 1960 2 Sheets-Sheet 2

WILLIAM A. YONKERS
INVENTOR.

BY
*Rudolph J. Jusick*
ATTORNEY

United States Patent Office 3,140,430
Patented July 7, 1964

3,140,430
STANDARD MAGNET STRUCTURE WITH
PREDETERMINED AIR-GAP
William A. Yonkers, Mountain Lakes, N.J., assignor to
Radio Frequency Laboratories, Inc., Boonton, N.J., a
corporation of New Jersey
Filed July 15, 1960, Ser. No. 43,181
2 Claims. (Cl. 317—158)

This invention relates to a standard magnet and more particularly to an easily assembled standard magnet which requires a minimum number of accurately machined parts.

Standard, or reference magnets comprising a magnetic structure which includes a permanent magnet and flux gap in the magnetic structure, in which gap a flux field of predetermined strength is created, are well known. The standard magnet is utilized in the calibration of gaussmeters, or the like, the magnetic flux sensing element located in the probe of the gaussmeter being positioned in the standard magnetic flux gap of known flux density and the gaussmeter being adjusted to provide an output reading corresponding to the known flux density.

Heretofore, it has been extremely difficult to produce a standard magnet having a uniform, or homogeneous, magnetic flux field without the use of a plurality of precision, and thus costly, interfitting parts. Further, most prior art stanadrd magnets are insufficiently shielded from the influence of external magnetic flux fields. Therefore, with known standard magnets, not only is the flux density changed to an unknown value during the presence of such external flux fields, but such fields may also permanently effect the strength of the magnet employed therein.

With the standard magnet of my invention a uniform flux density magnetic field is obtained by use of flat spacer members of non-magnetic, yet physically hard material which members are positioned a spaced distance apart between smoothly ground pole pieces. The spacer members, pole pieces and magnet are clamped together between cylindrical end plates within a tubular member under great pressure to maintain the arcuate relative relationship between the pole piece members. A hole is formed in the side wall of the cylindrical-shaped tubular member which hole cooperates with the flux gap between the pole pieces and through which hole the flux gap is accessible. The magnet is substantially completely shielded from external magnetic flux fields and, likewise, produces no stray flux fields itself. In addition to being of a novel construction, a novel method of clampingly securing the members of the standard magnet together is employed, by means of which method a homogeneous magnetic flux field is insured in the assembly thereof.

An object of this invention is the provision of a substantially completely shielded standard magnet having pole pieces which are easily, yet accurately, located in parallel spaced planes whereby a homogeneous flux field is obtained.

An object of this invention is the provision of a rugged standard magnet which will withstand shock vibration, and impacts due to dropping, or the like, without impairment of the homogeneity of the magnet flux field.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views:

FIGURE 1 is a side elevational view of the standard magnet of my invention;

FIGURE 2 is a top view of the device;

FIGURE 3 is a longitudinal cross-sectional view of the device taken on line 3—3 of FIGURE 2;

FIGURE 4 is a longitudinal sectional view of the device positioned in a press preparatory to an initial clamping operation during the assemby thereof;

Figure 5:
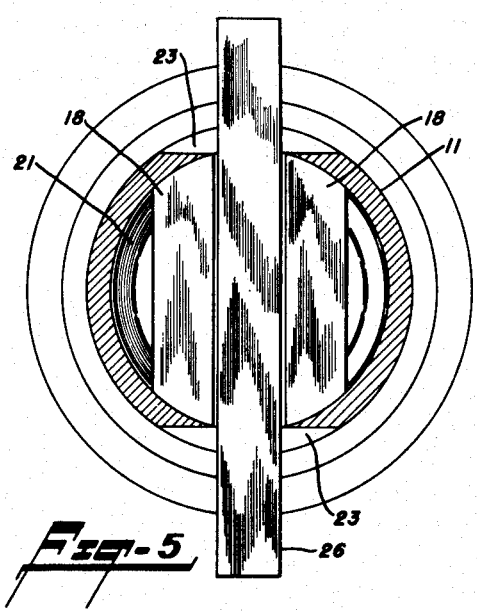
FIGURE 5 is a transverse sectional view of the device taken on line 5—5 of FIGURE 4.

Reference is first made to FIGURES 1–3 of the drawings wherein there is shown a novel standard, or reference, magnet device of my invention, designated generally by the reference numeral 10. The device comprises a tubular body member 11, of cold rolled steel or other suitable magnetic material, closed at opposite ends thereof by cylindrical-shaped end plates 12 and 12', which extend into the body member at the ends thereof. The end plates are also made of cold rolled steel, or other suitable magnetic material, and may be of identical construction but are provided with different reference characters for purposes of description only. The outer edge of each of the end plates is beveled, as indicated at 13, at any suitable angle, such as an angle of 45 degrees. The reduced thickness upper and lower ends 14, of the tubular body member are bent over to clampingly engage the beveled surfaces 13 of the said end plates.

Clamped between the end plates are a magnet 16, generally truncated cone-shaped pole pieces 17 and 17', and a pair of spacer members 18, 18. The pole pieces may be made of cold rolled steel, or other suitable magnetic material, and may be made of identical construction but, for purposes of description only, are provided with different reference characters. The spacers 18, 18 are made of a sufficiently hard non-magnetic material to resist compression and bending thereof during the assembly of the device. The magnet 16 is provided with opposite, and generally parallel, polar surfaces, as indicated by the reference characters N and S in FIGURE 3. A magnetic flux gap, designated 20, of uniform flux density is formed between the pole pieces 17 and 17' the length of which gap in the direction of the magnetic flux lines is accurately determined by the spacer members 18, 18 between the pole pieces. Annular guide rings 21, 21 of suitable non-magnetic material, such as aluminum, concentrically locate the truncated pole pieces while a similar non-magnetic annular guide, or spacer, ring 22 may be used to locate the magnet 16 concentrically with the tubular body 11. As best seen in FIGURES 1 and 2, holes 23, 23 are formed through the side walls of the tubular body member 11, while holes communicate with the magnetic flux gap 20 and through which a magnetic flux sensitive probe may be extended into the magnetic flux field of the device. It will be noted that the guide rings 21 may be of a dish-shape, including frusto-conical shaped edge portions 21', 21' which extend in oppositely facing directions to thereby facilitate the insertion of a probe into the magnetic flux gap. It will be apparent that the magnetic flux from the one pole designated "N" of the magnet 16 passes through the one pole piece 17', flux gap 20, pole piece 17 and returns to the other magnet pole surface "S" through the end plates 12, 12' and tubular body 11. A strip 27, of foam rubber or other suitable cushioning material, may be wrapped around the magnet 16 to prevent vibration of the ring 22 in the assembled device.

The spacer members 18, 18 are preferably made of beryllium copper, Phosphor bronze, or other suitably hard non-magnetic, material. The opposite large face areas of the spacers are preferably ground smooth with the said faces thereof lying in spaced parallel extending planes. The pole piece faces which abut the spacers are also preferably ground flat and smooth. By making the spacer members of relatively hard material, of the type specified above, for example, a minimum amount of compression and distortion thereof is effected when the device is assembled under large clamping forces. By forming the spacers with parallel large area faces, which abut the smooth pole piece faces, a uniform, or homogeneous magnetic flux field is provided in the air gap 20 when the device is assembled.

It will be apparent that even though the spacers 18, 18 are ground smooth with substantially parallel large area faces, and the pole pieces 17, 17' are provided with smooth pole faces, a uniform flux field in the air gap is not provided if the pole pieces are not clamped between the end plate 12 and magnet 16 under a substantially uniformly distributed pressure. That is, if greater pressure is applied adjacent one edge of the end plates than the diametrically opposite edge thereof during the assembly of the device, for example, a small difference in the air gap length will result in going through the air gap in the direction between different pressure areas. With my novel method of assembly of the device, the pole pieces are subjected to a substantially uniform pressure over the face areas thereof which are coextensive with the spacer members 18.

The device may be assembled by placing the guide ring 22 on the one end plate 12' and setting the magnet 16 on the end plate within the ring 22. (As one possible alternative method, the magnet 16 could be cemented to the bottom end plate 12 at the center thereof.) The tubular housing, or body 11, is placed over the end plate 12' and the cushioning strip 27 is located in the housing around the magnet. The pole piece 17' is placed on the magnet 16, and in order to prevent excessive radial shifting of the pole piece 17' on the magnet during the assembly of the device, the lower annular guide ring is placed upon the said pole piece. At this point in the assembly of the device, an elongated locating member 26, which is preferably made of plastic or a non-magnetic metal, is inserted through the holes 23 of the body, as best seen in FIGURE 5. The locating member is of a somewhat smaller thickness than the spacer members 18, 18 and is utilized to properly position such spacer members during the assembly of the device. As seen in FIGURE 5, the spacer members abut the locating device at the long sides thereof, the width and tapered side dimensions of the spacer members 18, 18 being such that the said members fit between the locating device 26 and the inside wall of the body 11. The upper annular guide ring 21 is then placed over the spacer members 18, and the upper pole piece 17 is set upon the spacer members within the hole in the upper guide ring. The upper end plate 12 is then placed on the upper pole piece 17 within the body member 11.

The device, as thus far assembled, is placed in an inverted position on a bed plate 28, as best seen in FIGURE 4. The bed plate 28 has a flat horizontal upper surface 28', and comprises a portion of a press, not shown in detail. A press head 29, which may include a threaded stud 30 extending therefrom for securing the same to the press, not shown, is provided with a frusto-conical shaped hole 31 therein, with the side wall 31' thereof tapering inwardly at the same angle as the bevel formed on the end plate 12', which, in the illustrated embodiment, tapers at an angle of 45 degrees. The press head, or matrix 29 is brought down upon the upper edge of the tubular body member 11, as viewed in FIGURE 4. Upon the application of a suitably large force in the direction of the arrow 32, the upper thin wall portion 14 of the body member, as viewed in FIGURE 4, is bent inwardly against the bevelled edge of the end plate 12'. It will be apparent that horizontal movement of the device 10 with respect to the flat plate 28 is permitted. Thus, it will be understood that a "self-centering" effect is obtained whereby a coaxial relationship exists between the said device 10 and matrix hole, or depression, 31 during the first bending operation. The one body edge 14, is thereby uniformly bent upon application of sufficient pressure thereto.

Figure 7:
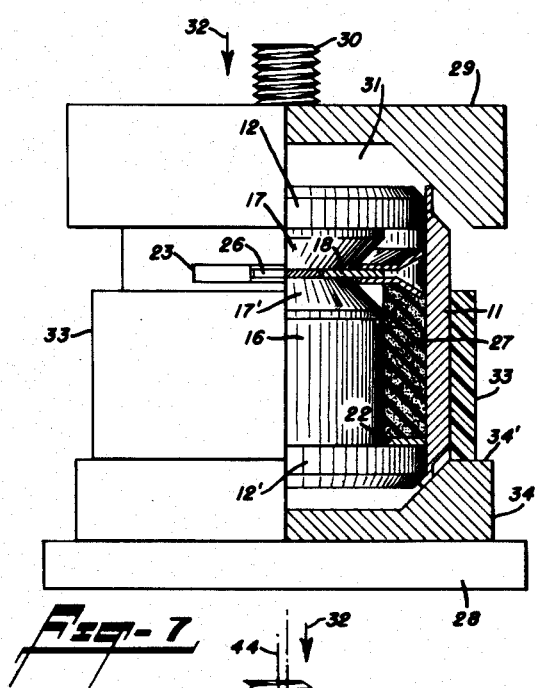
FIGURE 7 is a side view, with parts broken away for clarity, of the device during a final clamping operation in the assembly thereof.
Figure 6:
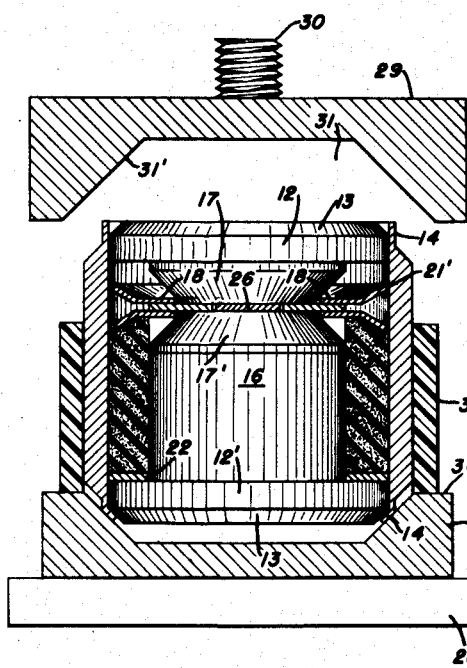
FIGURE 6 is similar to FIGURE 4 only showing the device in an intermediate stage of assembly.

Referring, now, to FIGURE 6, after the one edge of the body is bent inwardly the desired amount, the upper press plate is raised from the device, and a right cylindrical sleeve 33 is placed about the body 11 of the device. The device is then placed in an upright position (with the bent edge 14 down) on a second matrix 34 which may be of identical construction with the matrix 29 with the deletion of the threaded stud 30. The sleeve 33, which is made of plastic or other suitable material, serves to maintain the device in an upright position while the upper thin wall edge 14 of the body 11 is bent over. It will be understood that the sleeve 33 snugly fits over the body member 11 with the bottom thereof resting on the upper horizontal flat face 34' of the lower matrix 34, with the upper edge terminating a spaced distance below the locating tool 26. The lower matrix 34, device 10, and sleeve 33 are free to move together over the press bed 28 whereby the upper thin wall edge 14 of the body 11 is "self-locating" within the upper matrix 29. The sleeve 33 on the body member 11 prevents the said device from tilting if the initial contact between the upper matrix 37 and lower body edge is made at only one point. Thus, the body is properly "centered" in the upper matrix before sufficient pressure is applied thereto to bend the upper thin-wall edge 14. Upon application of sufficient pressure in the direction of the arrow 32, as seen in FIGURE 7, the upper thin-wall edge is bent over into engagement with the tapered edge 13 of the upper end plate 12 into the position illustrated by the assembled device shown in FIGURE 3.

It will be understood that although the magnetic structure includes hard materials, such as cold rolled steel, and the non-magnetic spacers 18, 18 employed therein are also made of relatively hard material, the pressure applied to end plates 12 and 12' through the bent edges 14 of the body 11 during the assembly of the device must result in a substantially uniform distribution of the pressure between the abutting spacer members 18 and pole pieces 17 and 17' in order to obtain a uniform air gap between the said pole pieces. Thus, if the pressure is substantially greater at one point on the beveled edge 13 of the end plate 12 than at a point diametrically opposed thereto, the compression and deformation of that portion of the spacer which is contiguous with the pole pieces will be non-uniform, with the result that the flux gap is also non-uniform.

Figure 8:
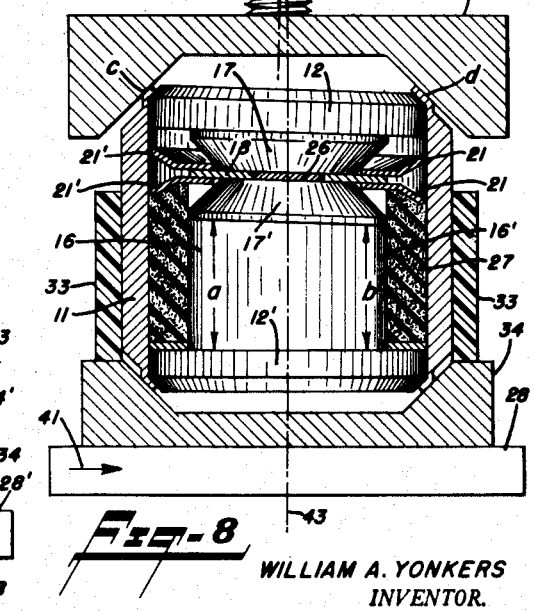
FIGURE 8 is a longitudinal sectional view illustrating the novel clamping action of my invention as applied to a standard magnet in which the magnet has non-parallel polar faces, the non-parallelism being shown greatly exaggerated for purposes of explanation.

With my novel method of assembling the standard magnets, a substantially uniform pressure is applied about the entire peripheral, beveled, edge of the end plates 12 and 12' during the second, or final, clamping operation. Such uniform pressures are obtained despite large dimensional errors in various components of the standard magnet. As mentioned above, the spacer members 18, 18 between the pole pieces 17 and 17', must obviously have substantially parallel opposite large area faces in order to provide a uniform air gap between the faces of the pole pieces. Other components of the standard magnet, however, do not have to be held to such close tolerances as the spacer members 18, 18 since my novel clamping method accommodates for dimensional errors in such members. Reference is made to FIGURE 8 of the drawings wherein there is shown a standard magnet at the completion of the second, or final, clamping action, in which device the magnet, designated 16', has non-parallel pole surfaces, the non-parallelism being greatly exaggerated in FIGURE 8 for purposes of explanation. The magnet length, designated "a" at one side thereof, is shown substantially greater than the length "b" at the other side thereof. If the upper matrix 29 were brought down coaxially with the lower matrix 34, it will be apparent that greater pressure would be applied to the one side of the pole pieces and to the spacer 8 to the left side, as viewed in FIGURE 8, than the other side of the pole pieces and the spacer 18 to the right. In accordance with my novel method, the device 10, together with the lower matrix 34, are free to travel horizontally across the bed plate 28 of the press during the pressing operation. As the upper edge 14 of the body 11 is being bent, it will be understood that the device and matrix 34 move to the right in the direction of the arrow 41, whereby the axis 43 of the device and lower matrix is displaced from the axis 44 of the upper matrix. The upper edge 14 of the body 11 at the left, and as identified by the reference character "c," thereby contacts the matrix 29 at a higher point than that portion of the edge designated "d." The final pressure of the matrix 29 on the body edge at the point "c" will be substantially equal to pressure applied to the edge at point "d" since any unequal horizontal pressure components result in a horizontal displacement of the body 11 together with the lower matrix 34. The pressure on the spacers 18, 18 between the pole pieces 17 and 17' is thereby substantially uniform whereby a uniform air gap is provided in the face of large dimensional errors in the components of the magnetic structure of the standard magnet. At a result, a homogeneous flux field is obtained. The flux density of the standard magnet is easily fixed following the assembly thereof by use of a suitable magnet charger and/or pull-down apparatus in a manner well understood by those skilled in this art.

Having now described my invention in detail in accordance with the requirements of the patent statutes, various changes and modifications will suggest themselves to those skilled in this art. For example, the use of the guide rings 21 and 22 in the assembly of the device are not essential since any suitable means may be used to properly position the parts during the assembly of the device. As mentioned above, the magnet 16 could be cemented to the lower end plate 12' to thereby eliminate the necessity of the guide ring 22. In like manner, the pole pieces 17 and 17', spacers 18, 18 and end plate 12 could be cemented together prior to clamping the body edges 14 over the said end plates to thereby eliminate the need for the guide rings 21, 21. Other obvious changes which are apparent to those skilled in this art included the elimination of one or both of the pole pieces 17 and 17'. If desired, the upper end of the magnet 16 could be shaped in the form of the pole piece 17' and the pole piece 17' removed from the construction. In like manner, the end plate 12 could be provided with a downwardly extending protrusion in the form of the pole piece 17, if desired, to thereby eliminate the need for the upper pole piece 17. Further, it will be apparent that only one hole 23 in the side of the body member is necessary, and that the said hole or holes 23 may be of any desired shape. In addition, a one-piece spacer member could be used in place of the two spacer members illustrated in the drawings. It is intended that these and other such changes and modifications shall fall within the spirit and scope of the invention as recited in the following claims.

I claim:

1. A standard magnet device comprising a tubular body member of magnetic material having ends of reduced thickness; a pair of end plates of magnetic material closing the ends of the body member, each end plate having a beveled surface on the outer edge thereof and the reduced thickness ends of the body member being flared inwardly into engagement with the beveled surface; a magnet concentrically positioned within the body member and spaced from the inner wall thereof, said magnet having parallel, opposite polarity polar surfaces with one polar surface abutting one of said end plates; a pair of pole pieces of magnetic material spaced from the inner wall of the body member, one pole piece abutting the other polar surface of the magnet and the other pole piece abutting the other end plate; means forming a flux gap between the pole pieces which means includes non-magnetic spacer means disposed between the pole pieces and in abutting relationship therewith; and means forming a pair of openings in the wall of the body member which openings are aligned with the said flux gap.

2. The invention as recited in claim 1, wherein the pole pieces are of a generally frustro-conical shape, the small ends of which confront each other, and including a pair of guide rings of non-magnetic material contacting the tapered surface of each of said pole pieces with the outer peripheral edge of the said guide rings contacting the inner wall of the body member; and an annular spacer member of non-magnetic material disposed in the space between the magnet and the inner wall of the body member.

References Cited in the file of this patent

UNITED STATES PATENTS

| | | |
|---|---|---|
| 1,941,476 | Jensen | Jan. 2, 1934 |
| 2,501,031 | Cunningham | Mar. 21, 1950 |
| 2,524,297 | Quam | Oct. 3, 1950 |
| 2,533,498 | Munson | Dec. 21, 1950 |
| 2,698,917 | Van Urk et al | Jan. 4, 1955 |
| 2,719,267 | Kunz et al. | Sept. 27, 1955 |
| 2,917,682 | Kirchner et al. | Dec. 15, 1959 |
| 2,925,541 | Koch | Feb. 16, 1960 |
| 3,084,419 | Procopio | Apr. 9, 1963 |